United States Patent [19]
Cook

[11] B 3,923,947
[45] Dec. 2, 1975

[54] PROCESS FOR CONTINUOUSLY PREPARING EXTRUDABLE, CROSSLINKABLE POLYETHYLENE COMPOSITIONS

[75] Inventor: Homer Johnnie Cook, Seabrook, Tex.

[73] Assignee: E. I. Du Pont de Nemours and Company, Wilmington, Del.

[22] Filed: Feb. 5, 1973

[21] Appl. No.: 329,816

[44] Published under the Trial Voluntary Protest Program on January 28, 1975 as document no. B 329,816.

Related U.S. Application Data

[63] Continuation-in-part of Ser. No. 84,668, Oct. 28, 1970, abandoned.

[52] U.S. Cl. 264/141; 260/94.9 GA; 260/94.9 GD; 264/176 R; 264/211; 264/349
[51] Int. Cl.² B01J 2/20
[58] Field of Search 264/140–143, 264/176 R, 211, 349, 40; 260/94.9 GA, 94.9 GD

[56] References Cited
UNITED STATES PATENTS

| | | | |
|---|---|---|---|
| 2,528,523 | 11/1950 | Kent | 264/349 |
| 3,121,914 | 2/1964 | Olson et al. | 264/211 |
| 3,484,507 | 12/1969 | Smith | 264/176 R |
| 3,546,326 | 12/1970 | Seifert et al. | 264/211 |

Primary Examiner—Jeffery R. Thurlow

[57] ABSTRACT

A process for preparing crosslinkable polyethylene compositions by a continuous mixing process in an extruder is provided wherein a suitable peroxy compound having a flash point of at least 70° C. and moderated by solution or dispersion, in an inert liquid carrier, such as mineral oil, is injected into a molten polyethylene composition in the mixing zone of the extruder and thoroughly admixed therewith at a temperature of 130° – 160°C., characterized in that between 0.1 percent and 5 percent by weight, based on the polyethylene composition, of a moderated peroxy compound is injected into the polyethylene composition in a mixing zone having a hold-up time of less than 12 minutes, preferably between 1 and 10 minutes under the conditions of operation. From the mixing zone the compounded, crosslinkable polyethylene is discharged through the nose of the extruder to a die and extruded in a form suitable for chopping into molding granules.

3 Claims, 1 Drawing Figure

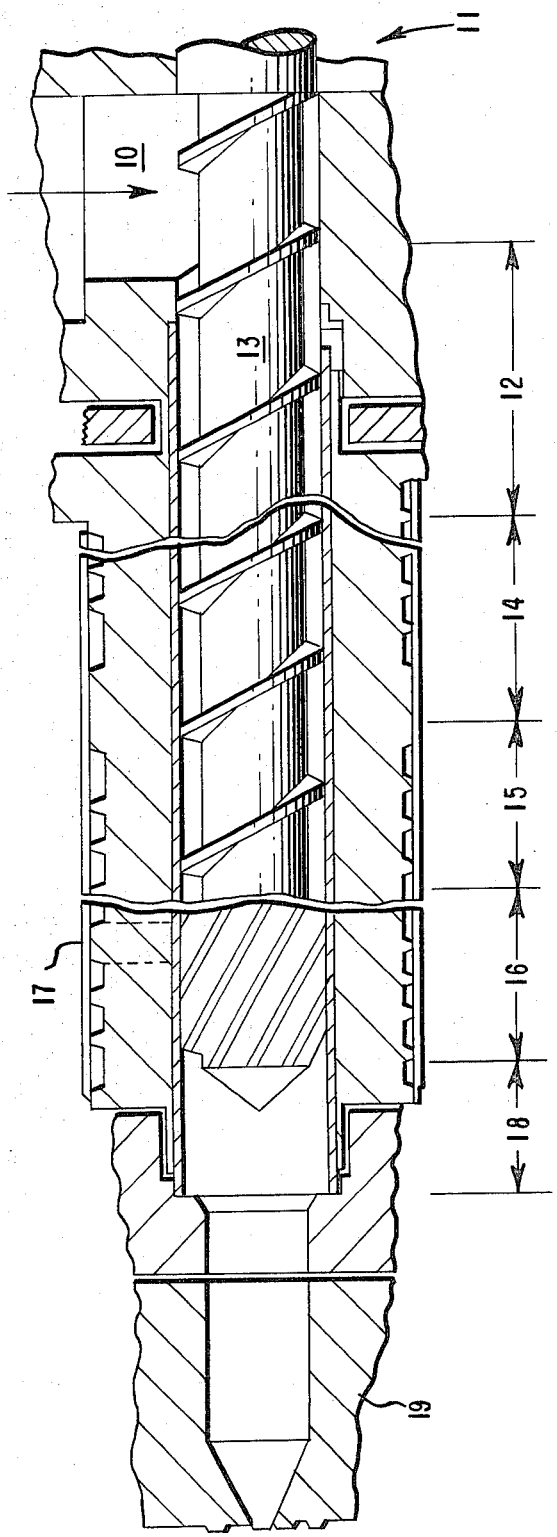

PROCESS FOR CONTINUOUSLY PREPARING EXTRUDABLE, CROSSLINKABLE POLYETHYLENE COMPOSITIONS

SUMMARY OF THE INVENTION

The application is a continuation-in-part of my copending application Ser. No. 84,668, filed Oct. 28, 1970 since abandoned.

The present invention provides a process of manufacture for continuously preparing crosslinkable polyethylene compositions in the form of molding granules. More particularly, the present invention is directed to a continuous process for preparing molding granules of crosslinkable polyethylene compositions by continuous mixing of a moderated peroxy compound having an equivalent half-life of more than 1 hour in the polymer melt with the molten polyethylene composition in the mixing zone of a mixer-extruder at a temperature between 130° and 160°C., said moderated peroxy compound being injected under pressure into the mixing zone of said mixer-extruder. Moderation of the peroxy compound is obtained by dissolving or dispersing the peroxy compound in a light oil or molten wax. After mixing with the peroxy compound in the mixing zone of said extruder, the resultant crosslinkable polyethylene compositions are immediately extruded through a die into a form suitable for chopping into molding granules. For example, the molten compositions can be extruded as strands, large diameter monofilaments or ribbons, which can be immediately melt-cut to provide molding granules. The molding granules are useful for subsequent fabrication into articles of commerce, for instance, wire-coatings, which, subsequent to fabrication, are crosslinked by heating to temperatures above 160°C., preferably in the range of 180°–200°C., to activate the peroxy compound and thus cause crosslinking of the polyethylene compositions.

BACKGROUND OF THE INVENTION

Crosslinkable polyethylene is a known polymeric material and is described in numerous patents, for example, U.S. Pat. Nos. 2,455,910, 2,628,214, 2,826,570, 2,888,424, 2,938,012, 3,079,370, 3,098,831, 3,334,080, 3,335,124 and 3,420,891. Processes for preparing crosslinkable polyethylene are also described in the aforementioned patents. As there described, these consist of batch operations wherein a crosslinking agent, such as a suitable peroxide, and a polyethylene composition, usually in granular form, are charged, in batches, to a mixing device such as a roll-mill or a Banbury mixer. The compounded composition is thereafter chopped into molding granules and placed into a suitable mold and concurrently shaped and crosslinked by heating the closed mold at an elevated temperature or extruded as a film, monofilament or wire-coating or injection-molded, and thereafter heat-cured. The resulting shaped, cured articles are of crosslinked polyethylene. For example, U.S. Pat. No. 2,938,012 mentioned hereinabove describes blending polyethylene on a two-roll mill with bis(3,4-dichloro-$\alpha'$,$\alpha'$-dimethylbenzyl)-peroxide and thereafter compression molding the blended composition at 350°F. thereby to obtain molded products having a high degree of crosslinking.

Significant drawbacks of the above described processes for preparing crosslinkable polyethylene resulting from use of batch-type milling operations include safety hazards associated with handling peroxy compounds in open, batch-type equipment, high cost and inefficiency of batch operation, nonuniformity of products obtained, and susceptibility to inadvertent contamination.

Occasionally it has been suggested that the peroxy compound, either a liquid or a solid dissolved in a liquid carrier, be added continuously to a molten polyethylene resin by injection into the head of an extruder, just ahead of the die, and the resulting mixture then immediately extruded, before it can set up, for example, onto a wire to form an insulated coating. Kent, U.S. Pat. No. 2,528,523, is illustrative of this technique. Unfortunately, this process does not produce the kind of thorough, intimate mixing obtainable from a roll-mill or Banbury mixer. Subsequent cure by heating the coated wire thus inherently fails to give a uniform cure throughout the polyethylene composition, tending to produce localized gels (regions of very extensive crosslinking) in a matrix of only partially cured polyethylene. Wire-coatings or other extruded articles made in this fashion inherently possess nonuniform physical properties. Such nonuniformity leads to premature failures when the crosslinked resins are subjected to heat, solvents, electrical or mechanical stresses.

It has also been proposed to fabricate heat-shrinkable fibers, foamed resin sheets or filaments, and the like, in a continuous process by simple extrusion of granules of polyethylene coated with a peroxy compound by spray-coating the granules with a solution of a peroxy compound or tumbling the granules with a powdered solid peroxy compound. The coated granules are then passed through an extruder rapidly to a fabricating die and curing furnace. This method of operation provides no thorough mixing of resin and peroxy compound to assure a homogeneous blend. It suffers from the further disadvantage that the coated, dry peroxy compound tends to powder off and concentrate at the bottom of container or of feed-hoppers, leading to a dangerous concentration of peroxide which may cause explosions. Exemplary of this mode of producing crosslinked articles of polyethylene are Benning et al., U.S. Pat. Nos. 3,203,503, Medalia, 3,105,057 and Hill et al., 3,404,104.

Either of the above two approaches also suffers from a further practical disadvantage from the viewpoint of commercial operation in the plastics industry. This serious disadvantage is that either approach requires the fabricator of the final crosslinked polyethylene article to install special equipment to handle the sensitive peroxy compounds and to add them to the polyethylene during the fabrication process which produces the final article of crosslinked polyethylene.

A fabricator can operate much more safely and economically if he can purchase crosslinkable polyethylene resin granules of uniform properties and employ them in his extrusion operations to produce a final article of crosslinked polyethylene. Until the present invention, such molding granules of crosslinkable polyethylene have been made by batch processes, which suffer from the disadvantages described above.

Furthermore, it has been found heretofore that in operation of such continuous fabrication processes as described above in which polyethylene granules coated with a peroxy compound are passed through the entire length of an extruder, the combination of long hold-up time and high temperatures required to insure complete melting of the polyethylene composition and some degree of mixing of the melt with the peroxy compound in the extruder result in excessive crosslinking of the polyethylene composition in the extruder. Under such conditions, the polymer may become excessively viscous, requiring unacceptably high extruder power consumption; this premature crosslinking can even proceed to such an extent that the polyethylene composition may "set up" entirely inside the extruder, preventing extrusion, with consequent danger to equipment and personnel from the high internal pressures resulting. If, on the other hand, extrusion temperatures are maintained sufficiently low to prevent premature activation of the peroxy compound, the polymer will be incompletely melted and hence excessively viscous so that complete mixing is not obtained and power consumption is excessive.

Accordingly, it is the principal object of the present invention to provide an improved, continuous mixing process for preparing crosslinkable polyethylene composition which is conducted in a mixing zone incorporated in a screw extruder used to produce molding granules or flake by extrusion and cutting of the extrudate.

DESCRIPTION AND EMBODIMENTS OF THE INVENTION

According to the present invention, there is provided a process for continuously preparing a crosslinkable polyethylene composition in the form of molding granules which comprises:

a. continuously feeding into the feed zone of a screw-extruder a polyethylene composition;

b. compacting and melting the polyethylene composition by working it in the compression zone of the extruder;

c. continuously advancing the molten polyethylene through a metering zone to a mixing zone in the extruder at a rate such that the average hold-up time in the mixing zone is less than 12 minutes, preferably from 1 to 10 minutes;

d. continuously injecting into the molten polyethylene, maintained at a temperature between 130°C. and 160°C. in said mixing zone, at a rate sufficient to produce from 0.1 to 5.0 percent by weight, based on the molten polyethylene composition in the mixing zone, of a peroxy compound having a flash point of at least 70°C. and an equivalent half-life of more than 1 hour, said peroxy compound having been moderated prior to injection by dissolution or dispersion in an inert liquid carrier compatable with the polyethylene composition.

e. continuously extruding the mixed crosslinkable polyethylene composition; and f. chopping the extrudate to produce molding granules of the crosslinkable polyethylene composition.

In particularly preferred embodiments of the invention the polyethylene composition contains an antioxidant such as 4,4'-thiobis(6-tertiary-butyl)meta-cresol or the polymerized form of the adduct of acetone with aniline, 1,2-dihydro-2,2,4-trimethylquinoline, the peroxy compound is 2,5-dimethyl-2,5-di(tertiary-butylperoxy)hexyne-3, and the liquid carrier is mineral oil.

Mineral oil, or any light oil or melted wax, is compatible with the polyethylene compositions and therefore does not have to be removed from the resultant molding granules of crosslinkable polyethylene composition.

The antioxidants, while not necessary for operation of the process of this invention, are used to stabilize the resultant molding granules and articles subsequently made from them against oxidative degradation. As suggested by Larsen, U.S. Pat. No. 3,335,124, and Eastman, U.S. Pat. No. 3,296,189, their presence may also retard premature crosslinking occurring either during compounding or during subsequent fabrication of articles made from the molding granules of crosslinkable polyethylene compositions produced by the process of this invention.

The term "polyethylene composition" used herein includes both high density and low density polyethylene and copolymers of ethylene with, for example, vinyl acetate, methacrylic acid, propylene, and ionic copolymers of ethylene such as described in U.S. Pat. No. 3,264,272, as well as blends of these materials with each other and compositions as described above containing additives such as pigments, fillers, stabilizers, antioxidants and lubricants, such as are known for use with polyethylene compositions.

Suitable blends include low density polyethylene/high density polyethylene, low density polyethylene/ethylene vinyl acetate, high density polyethylene/ethylene vinyl acetate, and low and high density polyethylene separately and in combination with any of the copolymers mentioned above, as well as blends with polypropylene. Typically, the polyethylene composition has a melt index from 0.1 to 50 (melt index is determined by the test described in ASTM-D-1238-5, condition E), usually the melt index is in the range of 1 to 4. A typical resin is a blend of between 50 and 75 percent of polyethylene having a density of 0.921 and a melt index of about 0.25, the remainder being of a density of 0.916 and a melt index of 12. The most preferred polyethylene composition is a low density polyethylene of 1.8 melt index and 0.918 density. While the homopolymers and copolymers and blends of two polymers have been above described, it should be clear that additional components can also be added so long as they are compatible and do not markedly affect the processing properties of a two-component system. In the case of copolymers, at least 50 percent by weight of the copolymer must be ethylene units. In the case of blends, low density or high density polyethylene or both must comprise at least 50 percent by weight of the polymeric components in the blend. For uniformity of expression these organic polymeric materials will be referred to herein on a collective basis simply as "polyethylene compositions," and the invention will be described and exemplified hereinafter with specific reference to polyethylene.

The nature and advantages of the process of the present invention will be more clearly understood by the following description and the accompanying drawing which depicts in schematic fashion a screw-extrusion apparatus suitable for carrying out the process of the invention.

The process and apparatus herein disclosed in illustration of the invention is shown schematically in the accompanying FIGURE. Referring to the accompanying FIGURE, the polyethylene composition is fed from a hopper 10 into the feed zone 12 of a screw-extruder device 11. The polyethylene composition is continuously advanced through the extruder device by suitable means such as advancing screw 13. The continuously advancing polyethylene composition is advanced from feed zone 12 to compression zone 14 wherein the polyethylene composition is melted by mechanical working and, optionally, also by application of heat thereto. The polyethylene composition melt is continuously advanced from compression zone 14 to metering zone 15 which pumps the melt forward at a uniform rate, controllable by the rate of rotation of the screw and the temperature and viscosity of the melt to mixing zone 16. In mixing zone 16 the polyethylene composition melt is mixed continuously with a suitable moderated peroxy compound which is continuously injected into the melt through one or more injection ports 17 which is in communication with mixing zone 16. The mixture of the polyethylene composition melt and peroxy compound in liquid carrier is continuously advanced from mixing zone 16 to discharge zone 18 at the nose of the extruder and discharged into a suitable die member 19 adapted to extrude the composition into any suitable form for producing molding granules. Usually a coarse monofilament form is preferred for chopping into granules, but ribbon or sheet extrudate can also be chopped to produce molding granules.

An essential feature of the present invention resides in the incorporation into the polyethylene composition of a peroxy compound moderated by dissolution or dispersion in a liquid carrier compatible with the polyethylene composition; suitable carriers include, but are not limited to light oil or melted wax. The requisite intimate mixing is accomplished by continously injecting the liquid moderated peroxy compound directly into the molten polyethylene composition in a mixing zone at the discharge end of the extruder. It is essential that between about 0.1 percent and about 5.0 percent, preferably between about 1.0 percent and 2.0 percent of the peroxy compound by weight, based on the weight of the polyethylene melt in the mixing zone, is added to the polyethylene melt.

Suitable peroxy compounds for injecting into the polyethylene melt include 2,5-dimethyl-2,5-di(tertiarybutylperoxy)hexyne-3; 2,5-dimethyl-2,5di(tertiarybutylperoxy)-hexane; $\alpha,\alpha'$-bis(t-butylperoxy)-diisopropyl benzene; 1,3,5-tri-[2-(t-butyl-peroxy)isopropyl]-benzene. Suitable peroxy compounds comprise any peroxy compounds characterized by an "equivalent half-life" of more than 1 hour. By this is meant that the peroxy compound is one which is equivalent in terms of its half-life in the polymer melt to a peroxy compound having a half-life in benzene of more than 1 hour at the extrusion temperature contemplated. Useful peroxy compounds may not be soluble in benzene; however, they should have a half-life in the polymer melt at least as long as the half-life in the polymer melt of a peroxy compound which has a half-life of more than 1 hour in benzene. Half-life in benzene is discussed fully by Mageli, Bokata and Bolton in publication Reprint No. 30.30 of the Lucidol Division of the Wallace and Tiernan Company (Buffalo, N.Y.). Briefly, the half-life is determined at various temperatures on a peroxy compound having a concentration of 0.2 mol per liter of solution. Aliquots of 10 milliliters each are pipetted into 16 × 150 mm. test tubes drawn for rapid sealing. The filled tubes containing about 5 ml. of air space are flushed with dry nitrogen, sealed and heated in a silicone oil bath at a desired temperature for the desired time. Before testing for residual peroxide, the tubes are cooled rapdily in ice water. The test for free peroxide utilizes the standard iodometric techniques and involves titration of the liberated iodine with standard sodium thiosulfate solution. Alternatively, infrared differential analysis techniques can be used.

The peroxy compound utilized in the process of the invention is further characterized by a flash point of at least about 70°C. The flash point of the peroxy compound is measured in accordance with ASTM-D-92-66. Peroxy compounds having flash points below about 70°C. are not suitable because they are too volatile and thus tend to evaporate from the cross-linkable molding granules produced.

By "moderated peroxy compound" is meant a peroxy compound that is dispersed or, more usually, dissolved in a liquid carrier compatible with the polyethylene composition. That is, the peroxy compound is not injected as a pure liquid or powdered solid directly into the polyethylene melt, but instead the peroxy compound is admixed with a liquid carrier and it is the latter liquid composition that is injected into the mixing zone of the extruder. Compatible liquid carriers include light oils or melted waxes. Light oil is a hydrocarbon fraction from kerosene to mineral oil, inclusive, having a viscosity of between about 150 centistokes and about 10 centistokes, as measured in accordance with ASTM-D-445-65. Thus, suitable light oils include mineral oil, mineral spirits and kerosene. The peroxy compound is preferably dissolved in a light oil having a boiling point of at least 200°C., preferably 250°C., and the resulting solution is injected into the polyethylene melt in the mixing zone of the extruder. The solution or dispersion of peroxy compound and liquid carrier is characterized by containing between about 35 percent and about 90 percent by weight, based upon the total weight of the solution, of the peroxy compound. The wax may be any of a low melting, fatty, plastic, amorphous substance of animal, vegetable, mineral or synthetic origin and usually consisting of higher monohydric alcohol esters of fatty acids. Sunoco Paraffin Wax No. 3425 is a preferred wax of synthetic origin. An advantage in the use of the liquid carriers employed in the process of this invention is that they need not be stripped (i.e., removed) from the resulting molding granules. That is, the properties of the resulting molding granules of crosslinkable polyethylene are not adversely altered by the presence of the liquid carriers, and hence the liquid carrier need not be removed therefrom.

Another essential feature of the process of the present invention resides in injecting the peroxy compound into the molten polyethylene in a mixing zone at the nose end of the extruder and controlling the hold-up time therein so as to disperse the peroxy compound in the polyethylene melt uniformly and safely without substantial crosslinking, thus minimizing formation of gel particles of highly crosslinked polyethylene, which typically form during conventional extrusion, from part of the polymer which is retained in the extruder for substantial periods. This latter feature is provided for in the present invention by selection of extruder dimensions and operating conditions such that the mixing zone is just before the nose of the extruder and, under operating conditions, the molten polyethylene composition is held up in said mixing zone for an average hold-up time of less than 12 minutes, preferably between 1 and 10 minutes. In a typical process, an extruder of either a single or twin screw construction capable of operating at high rates (2,000 to 10,000 lbs. per hour) is run while maintaining low melt temperature, for example 145°C., by application of cooling or heating, as required. A typical mixer-extruder suitable for use in this invention is described in Smith, U.S. Pat. No. 3,484,507.

The principle and practice of the present invention will now be illustrated by the following Examples which are only exemplary thereof. If is not intended that the invention be limited thereto since modifications in technique and operation in accord with the description above, will be apparent to anyone skilled in the art. All parts and percentages in the Examples are by weight unless otherwise specified.

The polyethylene compositions in the Examples were evaluated in accordance with the following procedures:
TENSILE PROPERTIES — The tensile properties of crosslinked polyethylene sheets, prepared by compression molding as 6 × 7 inch plaques in a press using a 125-mil chase and 20,000 pounds force at a temperature of 120°C. for 5 minutes from the crosslinkable polyethylene produced by the process of this invention and subsequently cured by heating for 15 minutes at 200°C under 20,000 pounds force in a press, were measured in accordance with ASTM-D-1708-66 at a strain rate of 20 inches/minute. Aged tensile tests were obtained from samples aged, after curing, for a period of 6 days at 180°C., one side only being exposed to the atmosphere.
CROSSLINKING — The degree of crosslinking of the polymer samples was determined both by a "swell test" and an extraction test as set forth is ASTM D-2765-68-C using xylene. Alternatively the extraction test can by done by the technique conducted as follows:

A round bottom flask with a ground glass joint connected to a reflux condenser is used. For a single determination a 500 ml. flask is used. For more than two simultaneous determinations a 2,000 ml. flask is used. A source of heat sufficient to boil the xylene is supplied.

The sample is prepared for testing by wrapping the sample in a pouch of 100 mesh wire cloth prepared by folding a 1 ½ × 3 inch piece of cloth into a 1 ½ × 1 ½ inch square and taking a ¼-inch fold on each of the open edges to form a pouch. The edges are then stapled (one side is open). The sample in the pouch is previously ground to 30 mesh sieve size and the fines which pass 60 mesh are rejected and not included in the sample. That which is retained on 60 mesh is put in the pouch and the pouch and sample are weighed.

The pouch is then sealed on the fourth side and the sample in the pouch is immersed completely in xylene and suspended in the solution near the bottom of the round bottom flask. About 1 percent of antioxidant is dissolved in the xylene to prevent further crosslinking of polyethylene. The xylene is boiled vigorously to assure good agitation. Typical boiling rates yield 20 to 40 drops/min. from the condenser. The sample is extracted 12 hours.

The sample and pouch are withdrawn from the boiling xylene and immediately placed in a vacuum oven preheated to 150°C. The sample is dried under at least 28 inches of vacuum for 16 hours. The sample is then cooled and weighed.

The percent solvent extraction is calculated as follows:
percent $= W_3 - W_4/(1-F) (W_2-W_1) \times 100$
where
$W_3 =$ weight of sample in stapled pouch before extraction,
$W_4 =$ weight of sample in stapled pouch after extraction and drying,
$F =$ fraction of xylene insoluble filler in polyethylene,
$W_2 =$ weight of sample and pouch with one side open before extraction, and
$W_1 =$ weight of 100 mesh pouch sealed on three sides.

EXAMPLES 1–6

Crosslinkable polyethylene compositions as identified in Table I below were prepared and extruded on an Egan Extruder No. 22160-2 under the conditions also set forth in Table I. In each instance, 2,5-dimethyl-2,5-di(tertiarybutylperoxy)hexyne-3 was injected into the mixing zone of the extruder in amounts as set forth in Table I. In each instance a crosslinkable polyethylene composition was obtained which was suitable for subsequent fabrication and crosslinking.

The resultant extrudate was chopped into molding granules. Portions of these were compression molded using 125 mil thick shims to produce plaques 6 × 7 inches in size and about ⅛ inch thick and cured in the press by holding at a temperature of about 200°C. for 15 minutes. Microtensile bars were die-cut from these and tested at a strain rate of 20 inches per minute following ASTM-D-1708-66. The results of these tests are shown in Table II below. The degree of crosslinking was determined, as described hereinabove, following ASTM D-2765-68-Method C using boiling xylene. Another indication of the crosslinking was obtained by the swell test defined in ASTM D-2765-68, Method C. In this test a weighed portion of the plaque was immersed in hot xylene at 110°C. for 24 hours, removed, blown dry and reweighed to determine the weight of xylene swollen polymer. This test is reported as the value of the ratio of the gel volume in swollen polymer divided by original volume of gel in the unswollen state. Thus the smaller the value, the less xylene has been absorbed and hence the greater the crosslinking. This crosslinking is permanent and does not change significantly on aging for 6 days at 180°C. in an air oven with one surface exposed to the atmosphere, as shown by the data in Table II below for percent extractables which, in every case, decreases slightly on aging, indicating a small increase in degree of crosslinking after 6 days at 180°C.

TABLE I

| EXAMPLE NO. | 1 | 2 | 3 | 4 | 5 | 6 |
| --- | --- | --- | --- | --- | --- | --- |
| Base Resin Type | Alathon 15[1] | Blend A[2] | Blend A[2] | Alathon 15[1] | Blend A[2] | Blend A[2] |
| Base Resin Melt Index | 4.0 | 1.25 | 1.25 | 4.0 | 1.25 | 1.25 |
| Extrusion Rate pounds/hour | 150 | 150 | 150 | 150 | 150 | 150 |
| Melt Temperature | 130°C. | 130°C. | 130°C. | 130°C. | 130°C. | 130°C. |
| Peroxide Solution | Lupersol 130[5] | Lupersol 130[5] | Lupersol 130[5] | Lupersol 130[5] | Lupersol 130[5] | Lupersol 130[5] |
| Solution | Mineral Oil 45% | Mineral Oil 45% | Mineral Oil 45% | Mineral Oil 45% | Mineral Oil 45% | Mineral Oil 45% |

TABLE I-continued

| EXAMPLE NO. | 1 | 2 | 3 | 4 | 5 | 6 |
|---|---|---|---|---|---|---|
| Injection Rate of Peroxide solution (lbs/hr/(cc/min) | 5.95/(50) | 3.57/(31) | 5.95/(50) | 8.34/(70) | 5.0/(42) | 8.34/(70) |
| Amt. by weight based on total weight of polyethylene | | | | | | |
| Peroxide[3] | 2.5% | 1.5% | 2.5% | 2.5% | 1.5% | 2.5% |
| Mineral Oil[3] | 3.1% | 1.8% | 3.1% | 3.1% | 1.8% | 3.1% |
| MT carbon black | 28.6% | 28.6% | 28.6% | None | None | None |
| "Age Rite Resin D"[3][4] | 0.5% | 0.5% | 0.5% | 0.5% | 0.5% | 0.5% |

[1]"Alathon" 15 is the Du Pont trademark for branched polyethylene resin of melt index 4 and density of 0.917.
[2]Blend A is a blend of 60% by weight branched polyethylene of 0.25 melt index and 0.921 density and 40% by weight branched polyethylene of 1.2 melt index and 0.916 density.
[3]Carbon-free basis.
[4]"Age Rite Resin D" is Vanderbilt's trademark for polymerized 1,2-dihydro-2,2,4-trimethyl quinoline.
[5]Lupersol 130 is Pennwalt's trademark for 2,5-dimethyl-2,5-di(tertiarybutylperoxy)hexyne-3.

TABLE II

PHYSICAL PROPERTIES OF CROSSLINKED POLYETHYLENE PREPARED FROM CROSS-LINKABLE POLYETHYLENE MADE VIA CONTINUOUS EXTRUDER PEROXIDE INJECTION

| EXAMPLE NO. | 1 | 2 | 3 | 4 | 5 | 6 |
|---|---|---|---|---|---|---|
| Xylene Extraction: | | | | | | |
| Orig. Swell | 6.2 | 5.2 | 4.0 | 5.0 | 9.7 | 5.3 |
| Orig. % Extr. | 14.3 | 9.5 | 9.1 | 8.4 | 11.4 | 8.9 |
| Aged Swell | 5.2 | 5.3 | 4.1 | 4.2 | 6.2 | 4.3 |
| Aged % Extr. | 10.2 | 9.3 | 6.6 | 6.2 | 10.8 | 6.7 |
| Room Temperature Tensiles: | | | | | | |
| Orig. Yield, psi | 1146 | 1362 | 1079 | 850 | 1260 | 950 |
| Orig. Break, psi | 2402 | 2768 | 2879 | 1320 | 2520 | 1480 |
| Orig. % Elong. | 284 | 334 | 276 | 300 | 540 | 260 |
| Aged Yield, psi | 1160 | 1354 | 1215 | 970 | 1350 | 980 |
| Aged Break, psi | 1556 | 2457 | 2145 | 2000 | 2680 | 1480 |
| Aged % Elong. | 135 | 205 | 182 | 380 | 640 | 180 |

EXAMPLES 7 AND 8

Melt-cut ⅛-inch pellets of a polyethylene composition comprising low density, branched polyethylene having a density of 0.920 and Melt Index of 1.8 and an antioxidant as indicated on Table III below are fed continuously to the feed hopper of a 15-inch, 200 horsepower Farrell Birmingham single-screw extruder having a terminal mixing zone. Concurrently, a peroxide solution comprising 50 percent by weight "Lupersol" 130 peroxide, Pennwalt's trademark for 2,5-diemthyl-2,5-di(tertiarybutylperoxy)hexyne-3, dissolved in "Sontex" 3725, a mineral oil having Sp. Gr. 0.88–0.89 at 60°F., a flash point of 425°F., and a viscosity at 100°F. of 360–380 SSU as measured by ASTM-D-446, was injected continuously into the mixing zone of the extruder by means of a triplex gear pump. The heat generated by working the polyethylene was greater than needed to completely melt the polymer. In order to control the temperature of polymer in the mixing zone and extrusion die, the extruder barrel was externally cooled on all sections, except the nose, by water. The extrudate, in the form of coarse monofilaments, was melt-cut into ⅛-inch pellets. Feed and injection rates, temperatures, and results are shown below in Table III.

TABLE III

LARGE SCALE PRODUCTION OF CROSSLINKABLE POLYETHYLENE

| Example No. | 7 | 8 |
|---|---|---|
| Base Resin Feed Rate, lbs./hr. | 2000 | 2036 |
| Melt Temperature in Mixing Zone | 140°C. | 146°C. |
| Peroxide Solution Injection Rate, lbs./hr. | 57 | 60 |
| Amount by weight, based on total weight of polyethylene | | |
| Peroxide ("Lupersol 130")[1] | 1.4% | 1.4% |
| Mineral Oil | 1.4% | 1.4% |
| Other additives by weight of polyethylene | | |
| "Age Rite Resin D"[2] | — | 0.2% |
| "Santonox"[3] | 0.2% | — |
| Cooling Water Temperature | 11–12°C. | 34°C. |
| Crosslinkable Composition: | | |
| Melt flow[4] at 115°C. ($I_{10}$) | 3.1 | 2.2 |
| % Peroxide | 1.4% | 1.4% |

[1]"Lupersol" 130 is Pennwalt's trademark for 2,5-dimethyl-2,5-di(tertiarybutylperoxy)hexyne-3.
[2]"Age Rite Resin D" is Vanderbilt's trademark for polymerized 1,2-dihydro-2,2,4-trimethyl quinoline.
[3]"Santonox" is Monsanto's trademark for 4,4'-thiobis(6-tertiarybutyl)m-cresol.
[4]Melt flow was determined by a modification of the melt index procedure described in ASTM-D-1238-65-T in which the temperature was 115°C. and load applied was 10 kg.

The molding granules of crosslinkable polyethylene composition produced by the process of this invention are useful for subsequent fabrication by standard methods into articles of commerce such as wire-coatings, cable insulation, films, and pipe. After fabrication, the fabricated articles can be crosslinked by subjecting them to a heating cycle at temperatures of 160°C. and above, usually 180°–200°C., for a time sufficient to activate the incorporated peroxy compound and thus complete the crosslinking of the composition. Use of temperatures above 160°C. for this purpose produces rapid crosslinking. Thus fabrication can readily be accomplished by simple extrusion at die temperatures in the range of 130°–150°C. Preferably the extrusion should be conducted with minimum hold-up time of the melt in the fabrication apparatus to minimize excessive premature crosslinking.

What is claimed is:

1. In a continuous process for producing a crosslinkable polyethylene composition in the form of molding granules in which a polyethylene composition is continuously fed into the feed zone of a screw extruder, therein compacted, melted and passed through a metering zone to a discharge die, and in which a solution of a peroxy compound is injected into the molten polyethylene composition inside the extruder prior to extrusion of the molten polyethylene composition through the die, and in which the extrudate is cut into molding granules, the improvement which comprises:
   a. selecting as the peroxy compound one which has a flash point of at least 70°C. and an equivalent half-life of more than 1 hour;
   b. moderating the peroxy compound prior to injection by forming a moderated peroxy composition by dissolution or dispersion of the peroxy compound in an inert liquid carrier which is compatible with the polyethylene composition, said liquid carrier being selected from the group consisting of light oil and melted wax;
   c. continuously injecting the moderated peroxy composition through injection ports into a mixing zone near the discharge end of the extruder at a rate sufficient to produce a concentration of from 0.1 to 5.0 percent by weight of said peroxy compound in the molten polyethylene composition in said mixing zone;
   d. maintaining the temperature in said mixing zone at between 130° and 160°C.; and
   e. operating the extruder screw at a rate such that the metering zone presses the molten polyethylene composition through the mixing zone and extrusion die at a rate such that the average hold-up time in the mixing zone is less than 12 minutes.

2. A process according to claim 1 in which the polyethylene composition fed is branched polyethylene containing an antioxidant selected from the group consisting of polymerized 1,2-dihydro-2,2,4-trimethylquinoline and 4,4'-thiobis(6-tertiarybutyl)m-cresol, the peroxy compound injected into the mixing zone is 2,5-dimethyl-2,5-di(tertarybutylperoxy)-hexyne-3, and the liquid carrier is mineral oil.

3. A process according to claim 1 in which the polyethylene composition fed to the extruder is branched polyethylene containing an antioxidant and the peroxy compound employed in the moderated peroxy composition contains at least two peroxy groups.

* * * * *